May 23, 1967 G. S. LOCKWOOD, JR., ET AL 3,321,584
MOTOR CONTROL FOR REPERTORY DIALER
Filed Jan. 3, 1963 6 Sheets-Sheet 1

INVENTORS
GEORGE S. LOCKWOOD, JR.
GENIO R. ARCIPRETE
WALTER J. GREENE
ROBIN C. MOSELEY
JOHN L. ROTHERY
BY

ATTORNEYS

May 23, 1967   G. S. LOCKWOOD, JR., ET AL   3,321,584
MOTOR CONTROL FOR REPERTORY DIALER
Filed Jan. 3, 1963                                                  6 Sheets-Sheet 3

INVENTORS
GEORGE S. LOCKWOOD, JR.
GENIO R. ARCIPRETE
WALTER J. GREENE
ROBIN C. MOSELEY
JOHN L. ROTHERY
BY
ATTORNEYS

May 23, 1967  G. S. LOCKWOOD, JR., ET AL  3,321,584
MOTOR CONTROL FOR REPERTORY DIALER
Filed Jan. 3, 1963  6 Sheets-Sheet 4

INVENTORS
GEORGE S. LOCKWOOD, JR.
GENIO R. ARCIPRETE
WALTER J. GREENE
ROBIN C. MOSELEY
JOHN L. ROTHERY
BY
Fryer + Gjenvold
ATTORNEYS INVENTORS
GEORGE S. LOCKWOOD, JR.
GENIO R. ARCIPRETE
WALTER J. GREENE
ROBIN C. MOSELEY
JOHN L. ROTHERY

ATTORNEYS

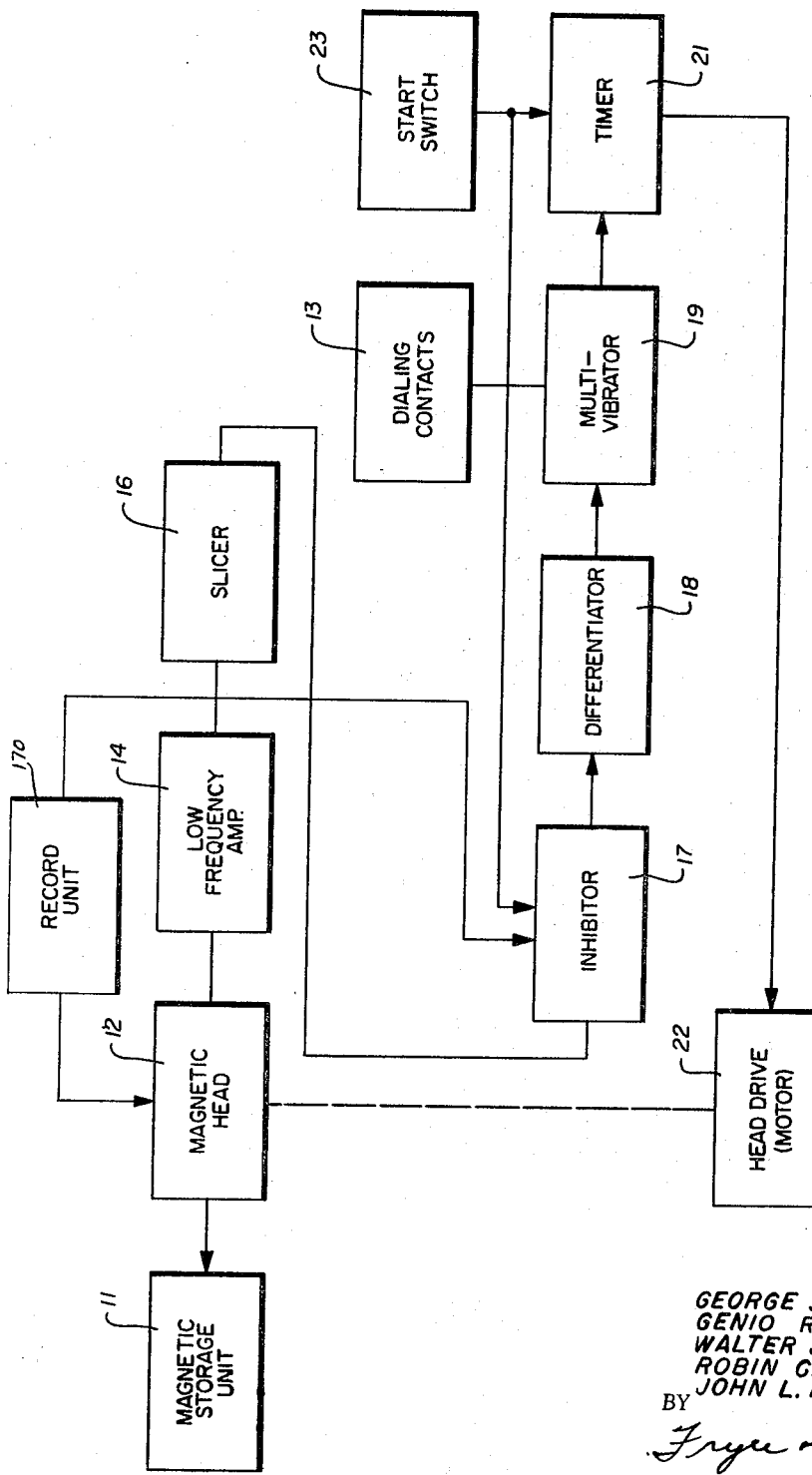

3,321,584
MOTOR CONTROL FOR REPERTORY DIALER
George S. Lockwood, Jr., San Mateo, Calif., and Genio R. Arciprete, Lexington, Walter J. Greene, Reading, Robin C. Moseley, West Acton, and John L. Rothery, Concord, Mass., assignors to Dasa Corporation, a corporation of California
Filed Jan. 3, 1963, Ser. No. 249,223
2 Claims. (Cl. 179—90)

The present invention relates to automatic telephone dialing equipment and methods and more particularly to automatic repertory telephone dialing equipment and methods including magnetic storage means and an electronic system for employing the information retained in the storage means.

With the tremendous growth in the use of the telephone a number of new, basic methods of telephony operation have been instituted in the past few years. For instance, because the length of time required to place a long distance telephone call has a direct bearing on the cost of furnishing such service, methods of reducing long distance calling time have been developed. By reducing the time required to place a long distance call, important savings can be made which should ultimately redound to the public in terms of better service and lower cost. DDD (Direct Distance Dialing), which is in widespread use, is one of the methods being used to bring about these beneficial results. DDD enables long distance calls to be made in a period of time within a second or two of that required to place a local call, and has thereby decreased cost and improved service.

With the increasing number of telephone subscribers and the use of DDD, another basic change in telephony methods has been made in the form of ANC (All-Number Calling), to enable a sufficient number of possible different code designations to be achieved to provide a nationwide numbering plan. The ANC system replaces a code which uses a word prefix followed by five digits with a seven digit code designation for a given numbering area. When a call goes from one numbering area to another numbering area, it is necessary to add a code designation for the called area. Thus, when an area code is combined with a local code there are at least ten digits employed, plus, in some instances, three or more additional digits are required for trunking directions. The ever increasing number and complications of telephone codes which a single subscriber frequently employs presages a third basic change in telephone equipment to accompany the two changes mentioned above. What is needed is a supplemental piece of telephone equipment which will reduce the growing complexities which the present day subscriber faces in employing the telephone.

The embodiment of this third basic change in telephone equipment is in the form of automatic telephone dialing equipment. Automatic telephone dialing equipment which can alleviate the complexities of present day use of the telephone includes a memory unit for storing station codes, and means for employing the memory unit information to automatically transmit telephone dialing instructions in response to a simple physical act by the subscriber, such as pushing a button.

Automatic dialers have been known in the art for several decades. Until recently, however, they have been though of as a luxury item rather than a necessity. Due to this general outlook, as well as certain technological deficiencies, automatic telephone dialers as presently known have not found widespread use as a basic part of the subscriber's telephone equipment. Thus, the known art does not contain effective means for alleviating the problems which accompany the use of DDD and ANC.

The performance characteristics desired of an automatic dialer have been fairly consistently recognized for some time. These basic characteristics include a storage means on which telephone designation codes are retained, means for selecting the particular designation code desired, and means for carrying out the dialing operation once the device is actuated. The most advantageous means for storing telephone designation codes is a magnetic medium—preferably magnetic tape. Magnetic tape is capable of having a high information storage density and also enables information to be readily added or changed as the need arises. Thus, while punched paper tape and various other information storage means are employed by automatic dialers known in the art, they do not enjoy a number of advantages which are presently required of an automatic dialer. Since magnetic tape storage means are the most advantageous, it follows that the means for employing the information on the magnetic tape to dial a telephone must be at least partially electrical in nature. It is primarily this electrical equipment employed in conjunction with the magnetic memory unit which prior art devices have been unable to satisfactorily provide.

To fully understand what is required of an automatic dialer to make it acceptable as a truly basic piece of equipment, it is necessary to explore the far reaching effects which such a device will have. As mentioned previously, DDD has reduced the amount of time required to place a long distance call. At the present time, a problem exists in the amount of time which it takes to place a local call (or a long distance call with DDD) by conventional dialing methods. Just as each long distance call requires a certain amount of plant and equipment, so does each local call. One of the most expensive areas of plant and equipment which a telephone system must maintain is the central office switching plant. From the time that a call is initiated until the time that a connection is made or the attempt discontinued, central office swiching equipment must be employed. It follows that the amount of time required to place a call has a direct bearing on the call capacity of the switching equipment in a particular area. As the number of calls increases the capacity of the switching equipment must also increase. As previously stated, the switching equipment of the telephone industry represents a major capital outlay. If the most efficient use of plant and equipment, and thus capital, is to be made, it follows that the efficiency of central office switching equipment must be as high as possible. Taking into consideration for the moment only the physical time required to place a call with an automatic dialer, as compared to that required by conventional dialing means, a time savings of a substantial percentage is realized. If this were the only consideration, there would be immediately a like increase in the efficiency of central office switching equipment if all calls were placed through automatic dialers. There are, however, a number of other significant factors which even further increase the efficiency of central office switching equipment through the use of an automatic dialer. These factors include the elimination of almost all incorrectly placed calls which, of course, tie up plant and equipment even though not completed. Also, just as DDD was found to encourage more long distance calling, experience has shown that with an automatic telephone dialer many more calls will be placed than through a manual dialer. Thus, the automatic dialer offers the telephone industry an increase in the efficiency of a vital portion of its plant and equipment and at the same time induces greater use of the telephone, thereby increasing traffic revenues. The subscriber enjoys the advantages which the telephone offers him without the present complexities which are attendant thereto, as well as a savings of time.

These advantages to the telephone industry and the consumer will only be realized to the extent that automatic dialers are employed. That is to say that the greater the penetration of the consumer market made by automatic dialers, the greater will be the advantages realized by the interested parties. The penetration which can be made by an automatic dialer is largely dependent upon two factors. The first, of course, is the performance characteristics of the equipment. It must be easy to operate, provide means for easily entering new information or changing old information, have a large capacity storage means, be able to dial numbers having dial tone pauses to gain access to area trunk lines or the like, be of small size, and operate reliably under various changes in physical conditions such as temperature, line voltage, etc. The second and probably the most important factor in determining consumer penetration, however, is the tariff which must be charged for such a piece of equipment. It has been conclusively determined in areas where automatic dialers have been offered by the telephone industry that the market penetration does not approach a really significant percentage until the tariff is no more than a few dollars per month. For each dollar that the tariff is reduced, the penetration into the consumer market increases tremendously. Since the tariff which must be charged on equipment provided by the telephone industry to subscribers is proportional to the cost of manufacturing the equipment, the design of an automatic telephone dialer is only successful in meeting the needs of the industry and public if it provides a device which can be manufactured at a very low unit cost.

When all of these factors—performance characteristics, method of operation, versatility and cost—are taken into consideration, the present invention provides the only automatic telephone dialing system known in the art which is suitable for becoming a basic part of the telephone subscriber's equipment.

The discussion which follows will make apparent the manner in which the basic differences between the present invention and the prior art provide the present invention with the necessary advantages to make it acceptable as a basic piece of equipment.

As is well known, a station designation code is transmitted by a conventional telephone set by sequentially selecting various letters or digits on a dialing wheel, rotating the dialing wheel to a stop position and then releasing the dialing wheel. The actual transmission of the signal takes place when the dialing wheel is released and urged to its normal position by means of a biasing spring. As the dialing wheel rotates toward its normal position a set of dialing contacts are opened and closed a number of times corresponding to the number selected on the dialing wheel. Thus, a complete dialing code designation comprises a series of separate pulse trains which are separated by a certain minimum time. The time between pulse trains enables receiving equipment to resolve individual digits. This is to say that by making the time between pulses of a given digit (intra-digital time), less than the time between digits (inter-digital time), receiving equipment can tell when a pulse begins a new digit.

As the dialing contacts are opened and closed to form a pulse train to represent a digit, they form a precise signal which the receiving equipment is designed to understand. A pulse is designed to telephone industry specifications to be of a specific duration, and the time between pulses of a train (intra-digital time) is also of a specified time. It is further required that the dialing contacts open time be a specific percentage of the contacts close time. Thus, standards of an absolute nature as well as a relative nature are set up. The relative standard makes the necessity of precision very great since a signal may be within the limits of the absolute time standards but not meet the relative standard, and thus be incoherent to receiving equipment.

An automatic dialer, if it is to be capable of becoming an integrated unit in the overall telephone system must provide pulse trains which meet the precise requirements of the telephone industry. Prior art devices have employed either the dialer of the telephone which the device accompanies, or a dialer which is a permanent part of the device, to initially record the signal into the magnetic storage means. When it is desired to play back the station designation code which had been previously "recorded on" the magnetic storage memory, a magnetic transducer head scans the magnetic storage means at a precise location to read the pulses previously placed thereon. The signal which the magnetic head produces in response to reading the tape is then employed to operate a set of dialing contacts so as to transmit the desired signal. Between the magnetic head and the dialing contacts, there is operatively disposed certain necessary electrical components such as amplifiers and the like.

While the above method of employing the information in a magnetic storage means to dial a telephone is straight forward, the prior art indicates that such a method lacks the necessary precision to meet telephone industry standards. The prior art indicates that in the process of recording a signal onto a magnetic storage means and then subsequently recalling the information by reading it with a magnetic transducer head, distortions and extraneous signals are introduced rendering the signal incapable of directly controlling a set of dialing contacts so as to produce an acceptable pulse train. To overcome this deficiency, prior art devices have been modified to employ a system which is interposed between the magnetic storage means and the dialing contacts and which insures the necessary accuracy. This intermediate system normally includes an oscillator capable of producing pulses of frequency and shape similar to the pulses produced by manual dialing of a telephone, and means for running the oscillator a specific length of time proportional to the number which is to be transmitted. In other words, such systems operate by a magnetic head reading information from the magnetic storage means, means transferring this information to an intermediate system which uses the information to control the duration which an independently operated oscillator is activated, and means transmitting the output of the oscillator to means which respond to pulses by operating dialing contacts.

The automatic dialers using magnetic storage means of the type just described are for the most part electro-mechanical in nature. This is to say that while they employ amplifiers and oscillators which may be termed as electronic, the logic of the system is performed almost exclusively by means of relays, solenoids, and motor driven dial cams. While these systems function in a manner which generally provides some of the performance characteristics desired, they have a number of serious deficiencies, including cost, which the present invention overcomes. These prior art electro-mechanical devices, each of which has associated therewith a permanently mounted dial mechanism for recording information into the memory unit, are expensive to the point of having only very limited potential market penetration and due to the use of solenoids, relays and other heavy equipment, are large, heavy and noisy in operation.

The present invention provides an automatic dialing system which meets all of the operating characteristics the telephone industry should require, is sufficiently inexpensive to manufacture to enable the tariff to be low enough to insure exceptionally high market peneration, does not have a permanently mounted dial mechanism associated therewith, is relatively compact in size, is equipped to handle the longest code designations, including dial tone pauses, and is virtually noiseless in operation.

As mentioned above, prior art devices have found it virtually impossible to use the signal from the magnetic head to directly control a set of dialing contacts. The usefulness of the head signal, however, is relative to the system into which it flows. The signal does in fact have all of the information necessary to accurately control the dialing contacts directly. What is required is a system capable of taking advantage of that part of the signal containing the accurate information and being unaffected by the distorted portions of the signal. The present invention provides just such a system, and in so doing eliminates the added expense involved in a system employing a separate oscillator-transformation stage. The cost of providing a system capable of employing the head signal directly in the manner taught by the present invention is less than the cost of an electro-mechanical type dialer as known in the art by a very significant amount. Enough so, in fact, to make the difference between a device being practical as a necessity and a device being suitable only as a luxury.

The present invention enjoys further advantages over the prior art dialers by reason of its use of electronic solid state devices. These devices provide dependable operation at low cost, can be assembled along with other components by highly efficient mass production techniques and are totally silent in operation.

One of the outstanding features of the present invention which will be described in greater detail below is the novel means used to record information in the magnetic storage memory. As previously noted, prior art devices employ either telephone set dial mechanisms or have their own permanently connected dial mechanisms for the same purpose. The use of the telephone set dial mechanism is unacceptable due to the rather large number of interconnections required between the telephone set and the automatic dialer and further because the telephone dial mechanisms are not mechanically precise enough. The permanently disposed separate dialer is disadvantageous due to the cost and size which it adds. The present invention employs a dial mechanism which interconnects with the automatic dialer through a simple plug and is therefore easily detachable when its use is not required. Since the dial mechanism is only required when new numbers are added to the memory unit or old ones erased, it will be unused a great percentage of the time. The dial mechanism of the present invention is operable with any automatic dialer of the design of the present invention and therefore can be employed to service a great number of conveniently located units. In this manner, the cost involved in providing means for recording information into the memory unit need only be a small fraction of that required for dialers as known in the art. Without a permanent dial mechanism, the unit of the present invention enjoys the further advantage of being much smaller and lighter than dialers presently known in the art.

Inasmuch as an automatic dialer which will enjoy a great penetration into the market will be used under a wide variety of conditions by a rather large cross section of the populace, it is necessary that the equipment rendering this service be designed to handle all foreseeable contingencies with a minimum of disturbance in service to the customer. It should be noted in the detailed description which appears below that the present invention provides an automatic dialer which not only operates under ideal conditions but is painstakingly designed to prevent the transmission of incorrect numbers which may be caused by conditions being far less than ideal. This, of course, is necessary if the potential benefits to the telephone industry and public are to be in fact realized.

Accordingly, it is an object of the present invention to provide an automatic telephone dialing system which is in all respects suitable as a basic instrument to complement the present telephone set.

It is another object of the present invention to provide methods and apparatus for advantageously transferring information from a magnetic medium on which it is stored to a device to be operated in accordance with the nature of the information.

It is another object of the present invention to provide unique methods for advantageously employing information, stored in the form of spaced magnetic patterns on a magnetic medium, to operate a set of dialing contacts.

It is another object of the present invention to provide an automatic telephone repertory dialing system which can be produced at a cost sufficiently low to insure a sizeable market penetration.

It is a further object of the present invention to provide an automatic telephone dialing system which is primarily electronic in nature.

Another object of the present invention is to provide methods and means by which information stored in the form of magnetic space patterns can be transformed into accurate electronic signals.

It is a further object of the present invention to provide an automatic telephone dialing device which is of a relatively compact size, easy to operate, capable of storing a large number of station designation codes, designed to operate properly under a wide variety of adverse conditions, is virtually noiseless in operation, and capable of providing the necessary operating characteristics.

Still a further object of the present invention is to provide an automatic telephone dialing system employing a magnetic storage unit wherein information is recorded into the magnetic storage unit by means of a detachable dial mechanism.

A further object of the present invention is to provide several unique electronic circuits which are especially useful in information transfer devices such as automatic telephone dialing equipment.

Further and more specific objects and advantages of the invention are made apparent in the following specification wherein a preferred form of the invention is described by reference to the accompanying drawings.

In the drawings:

FIG. 11 is a block diagram similar to that of FIG. 1 but with the dialer conditioned to have information recorded in its memory unit.

Figure 1:
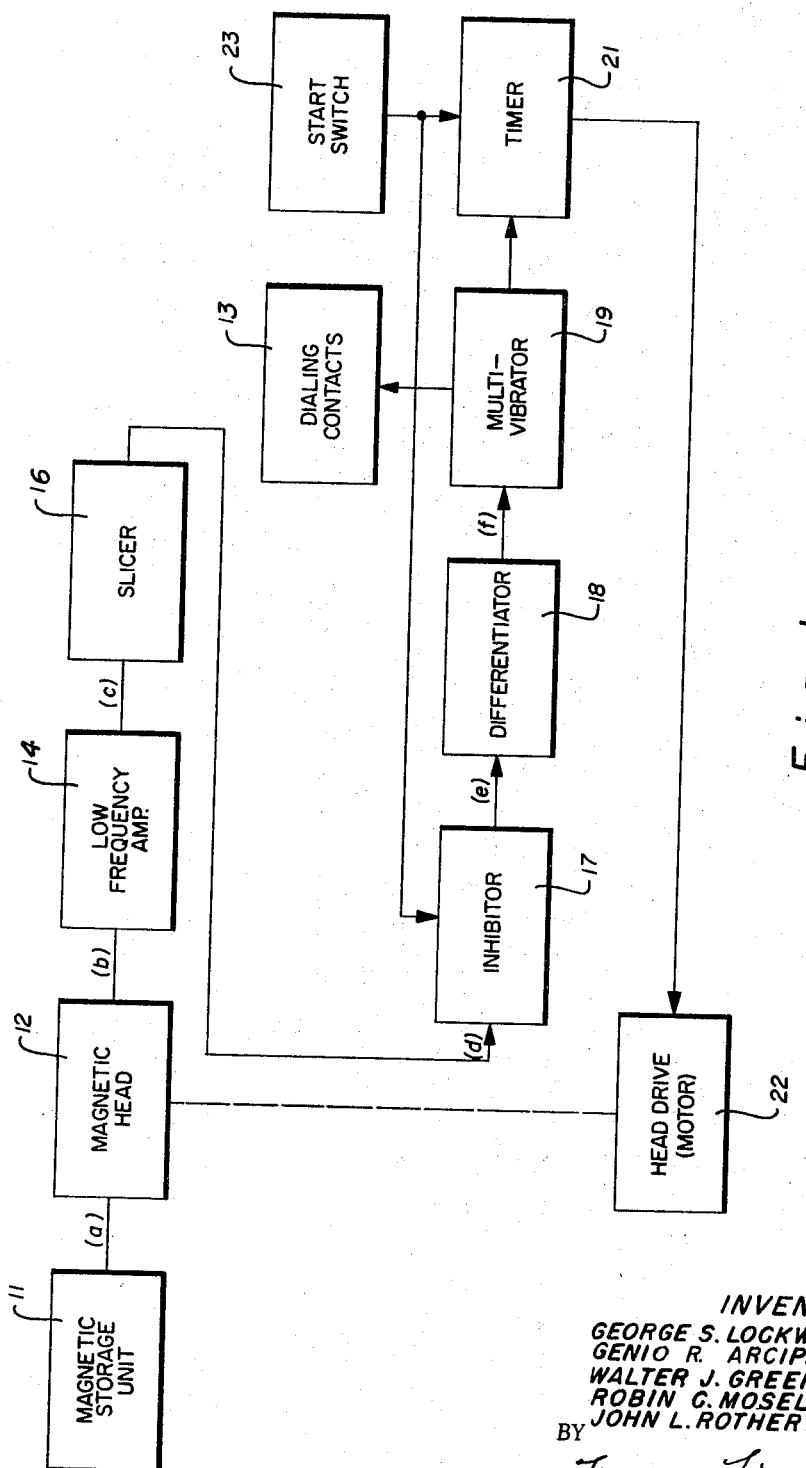
FIG. 1 is a block diagram of the electronic circuit of the invention wherein the circuit is conditioned for dialing.

Since one of the outstanding features of the present invention is its ability to be selective in using available information, it is necessary for a full understanding and appreciation of the invention to known how the information initially gets into the memory and how it gets out. And most important, what happens to the information when it is transferred from one place to another. One of the final manufacturing processes employed in the production of magnetizable tape is degaussing. Thus, an unused tape is thoroughly unmagnetized. As will be explained, an erased tape is not.

The information which the present invention desires to put on a magnetic medium is the condition of a set of dialing contacts. Since the dialing contacts are always in one of two possible conditions—open or closed—it is a straight forward matter to put this information on magnetic tape by magnetizing the tape in one direction to represent one condition and in an opposite direction to represent the other condition. Telephone dialing contacts are as a rule closed in their normal condition and opened in their activated condition. If the closed condition of dialing contacts are associated with the tape being magnetized in the positive direction (an arbitrary selection) and the open condition with the tape being magnetized in the negative direction, there will be information on all parts of the tape that are magnetized.

Information is put on the tape by means of a transducer head which functions in a well known manner. When current flows through the head in one direction the portion of the tape adjacent to the head is magnetized in one direction while current flow in the opposite direction induces oppositely directed magnetization. The head is connected to the dialing contacts when the device is conditioned to record information into the memory such that the appropriately directed magnetizing current flows under the two possible contact conditions to induce appropriately directed magnetization.

Assuming for illustrative purposes that it is desired to record the digit "3" into the memory storage unit; the following is the sequence of operation. A finger is engaged in the digit "3" hole of the wheel of a dial mechanism and rotated to the stop position, and then released. Upon release of the wheel a special switch (not the dialing contacts nor other normally contained contacts) is activated causing a head to start moving across the tape. The dialing contacts are in their normal position so that all of the tape which the head scans before the dialing contacts are pulsed by the dialing wheel will be positively magnetized (as previously defined). By the time that the dialing wheel causes the dialing contacts to open for the first time, the head will have reached its full scanning speed. When the dialing contacts open, the current through the head reverses and all of the tape traversed by the head while the contacts are open will be magnetized in a negative direction. The contacts will open and close three times so that three negatively directed magnetized areas will be induced on the tape, each separated by a positively directed magnetized area. A graphic representation of a tape with the digit "3" recorded on it is shown in graph (a) of FIG. 2.

It is a requirement of a segment of telephony that the intra-digital time be 40% of a complete dialing pulse cycle while the pulse itself be 60% of the cycle—within given tolerances. For this reason, standard dialing mechanisms which form part of a telephone set are designed to drive the dialing contacts such that they are open 60% of a complete pulse generating cycle and closed for the rest of the cycle. If a dialing mechanism having these characteristics is used to control the flow of current through a head, the length of the magnetized areas forming a digit pattern will have a 60–40 relationship. When the tape is subsequently read, however, the pulses and adjacent intra-digital spaces are for all practical purposes of equal length. This loss of relative time information which occurs in taking the code off the tape is due to the fact that the head signal passes through zero each time the rate of change of flux ($d\phi/dt$) is zero and this occurs at equal intervals. The relative lengths of the magnetized areas as shown in graph (a) is approximately 60–40 and thus representative of the pattern which is actually induced on the tape. Graph (a) does, however, idealize the separation of differently directed magnetized areas by illustrating it as a sharply defined boundary. Actually, the change from one magnetized area to another occurs over a finite distance. The separating lines shown in the graph are centrally located within these change-over areas and by being idealized simplify the discussion concerning them.

Figure 2:
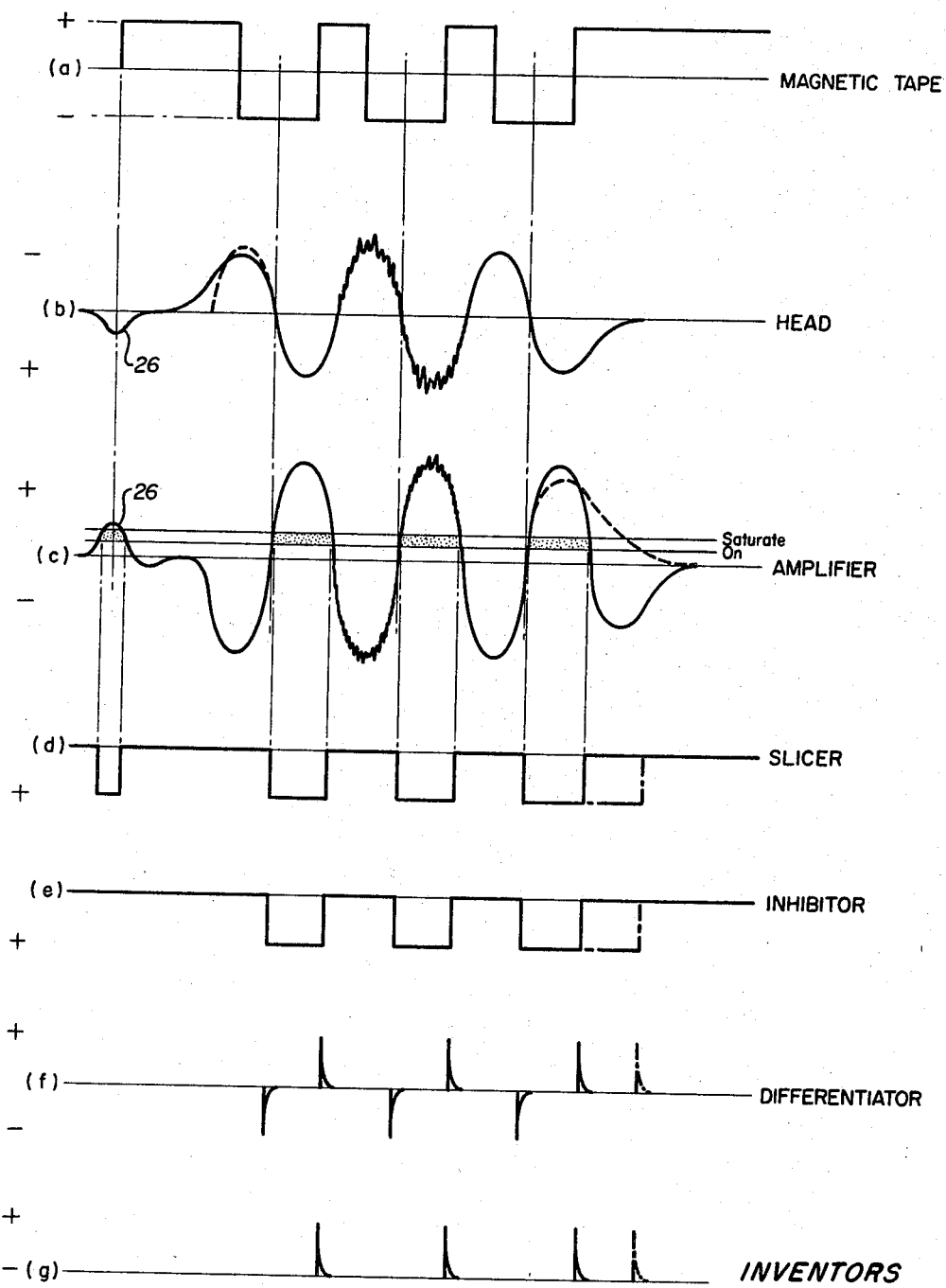
FIG. 2 illustrates the various wave shapes that can exist at various points in the circuit of FIG. 1.

When a station designation code is stored in a magnetic memory, such as magnetic tape, it initially suffers the information loss discussed above, and also suffers due to distortion when transferred to a magnetic transducer head. Graph (b) of FIG. 2 illustrates the general shape of the signal induced in a head as it scans the magnetic pattern shown in graph (a). The head may pick up a signal blip 26 which is totally unrelated to the digit pulse train of interest. The first and last half cycles of the signal are distorted (longer periods than the other half-cycles), and a considerable amount of hash is superimposed on the signal (as illustrated on the second cycle only) due to mechanical jitter, 60 cycle hum and thermal noise. It is signal defects such as these which the prior art was unable to cope with, and which thus prevented the direct control of a set of dialing contacts with the requisite precision. Before describing the manner in which the present invention extracts and uses the accurate and consistent portions of the head signal which the prior art discards, a brief description of the overall operation and logic of the invention will be given.

Referring now to FIG. 1, the telephone designation code information is stored in a magnetic storage unit 11 and recalled therefrom by means of a magnetic transducer head 12. The signal from the head 12 controls a set of dialing contacts 13 which causes a signal to be imposed on telephone lines and thus transmitted to central office equipment.

In order that the dialing contacts be controlled in a precise manner and meet the required standards, an electronic conditioning circuit is operatively disposed between the output of the head 12 and the input to the dialing contacts 13. This electronic conditioning circuit includes a low frequency amplifier and filter 14, a slicer 16, an inhibitor 17, a differentiator 18 and a monostable device, which for expository purposes is here considered to be the monostable multivibrator 19. These are the components which are responsible for selecting the desired information from the head signal and preventing the unnecessary portions of the signal from disrupting operation.

The multivibrator 19 has two electrical states (normal and off-normal) in which it exists. When a pulse of the proper polarity is received by the multivibrator 19 it changes from its normal to off-normal state, and thereby causes dialing contacts 13 to open. Once the multivibrator 19 is induced to its off-normal state (opens dialing contacts) it will remain in that state for a duration which it determines itself. Thus, the multivibrator 19 controls the duration which the dialing contacts remain open, and as long as pulses are received at the proper intervals, the dialing contacts will be pulsed in the identical manner in which they would be pulsed by manual dialing. Besides controlling dialing contacts 13, the multivibrator 19 also responds to incoming pulses of the proper polarity by operating a timer 21.

Timer 21 energizes a head drive means 22 (normally a motor) when it (the timer) is on. The drive means is mechanically connected to head 12 and furnishes the power to drive the head 12 relative to the magnetc storage unit 11. Once the timer 21 is turned on, it is assured of remaining on for a minimum duration which it determines itself and which is independent of the signal which turns it on. The minimum time period is referred to as the timer "on-time" and it should be kept in mind that the "on-time" is only a minimum time and the timer 21 will generally remain on for a longer time period, as will be seen.

Assuming the head 12 to be at a location on the magnetic tape where a station code designation is stored, operation of the system to dial proceeds as follows. A start switch 23 is operated causing the head 12 to return to a starting position (this is done mechanically and is not shown) and the timer 21 to turn on. Each time the timer 21 is turned on, the head drive means 22 will be energized and drive the magnetic head 12 for a period of time no less than the timer's on-time. If during the on-time of the timer 21 no negative pulses are scanned by the head 12, the head 12 will come to rest. If, however, during the timer on-time a negative pulse is encountered by the head 12, a signal will be generated in the head 12, pass through the electronic conditioning circuit and energize multivibrator 19 so that the dialing contacts 13 will be open for a precise length of time. The multivbrator 19 will also signal timer 21 to start its time cycle running again, thus resulting in further energization to the head drive means 22. It follows that as long as pulses are received from the head 12 by multivibrator 19 at time intervals less than the on-time of timer 21, the head 12 will be continuously driven across the tape. The on-time of timer 21 is designed to be greater in duration than the inter-digital pulse time so that once the magnetic head 12 begins to read a station designation code from the magnetic storage unit 11 it will continuously read the entire code (assuming that no dial tone pauses are included). If it is necessary to get a dial tone signal after a portion of the code is dialed, an inter-digital time of greater duration than the timer on-time is placed in the magnetic storage unit 11 at the appropriate location.

The manner in which the head signal is acted upon to provide the information necessary to operate the automatic dialer of the invention as set forth above is best described with reference to FIG. 2. Graph (a) of FIG. 2 which illustrates the pattern on a magnetic tape representing the digit "3," has a horizontal axis which can be considered as a measure of either distance or time. In considering the horizontal axis as distance, movement along the axis from left to right represents movement across the tape from left to right (arbitrary selection). Moving from left to right along the axis when the axis represents time is moving in an increasing time direction. The traveling speed of the head 12 is the factor by which distance and time along the horizontal axis can be related. It will be necessary to consider the horizontal axis as represenitng both distance and time in the discussion which follows. The plus level of graph (a) indicates magnetization which represents the dialing contacts in their closed condition, the negative level represents the contacts in their open condition, and the zero level indicates the absence of magnetization.

The short unmagnetized length of tape at the left edge of the horizontal axis represents the distance in from the edge of the tape which the head is placed when starting to operate for the purpose of recording information into the magnetic storage unit 11. The exact details of how information is recorded into the magnetic storage unit 11 will be set forth below. It can be stated at this point, however, that the dialing contacts will always be closed when current is initially sent through the head 12. Thus, the first information which goes on the tape is always in the form of positive magnetization as indicated in the graph. Because the tape is initially unmagnetized it is necessary initially to go from a zero level to a magnetization level. If the head subsequently scans this initial change of magnetization when reading the tape, it will have a blip generated at its output as a result. Blip 26 of graph (b) illustrates the result of the head reading this initial flux level change. As previously explained, the remainder of graph (a) represents the magnetization pattern indicative of the digit "3."

Graph (b) represents the signal which is generated in the head 12 as it passes over the magnetized portion of tape shown in graph (a). The three cycle wave generated in the head 12 crosses the axis (indicating zero signal) each time the rate of change in flux is zero $$\left(\frac{d\phi}{dt}=0\right)$$

The first negative half cycle of the wave, as shown in a solid line, is distorted with respect to the dotted line which represents the shape of the two following negative half cycles. This is due mainly to the fact that adjacent half cycles tend to cancel out portions of one another and the first and last half cycles have only one, rather than two, adjacent half cycles.

As the signal is passed through the amplifier 14 it is increased in magnitude and inverted in polarity. The amplifier 14 also performs two other rather important functions. First, the response of the amplifier is designed to be most effective at dialing signal frequencies and thus suppresses the hash such that the signal to noise ratio is increased. The amplifier 14 further aids the signal by being tuned to ring so as to add an additional half cycle to the wave. In order to prevent uncontrolled ringing the last half cycle must be damped and thus distorted. The phantom line of graph (c) indicates the shape which the last positive half cycle would necessarily assume if controlled ringing of the amplifier 14 did not provide the extra half cycle.

The hash which appears on the amplified signal is greatly reduced from that on the head signal (signal to noise ratio increased) due to the fact that the amplifier 14 has a frequency response which is designed to cut out 60 cycle and 120 cycle line frequency harmonics. And to prevent the hash which remains on the wave from interfering with the required accuracy, only thin slices of these positive half cycles are used. Extracting a thin slice from the positive half cycles of the wave of graph (c) is accomplished by passing the amplified signal through slicer 16 which produces an output signal only in response to positive input signals, and only to positive input signals above a certain magnitude. Graph (c) has a horizontal line above the horizontal axis which is labeled "On" and indicates the voltage at which the slicer 16 is turned on and an output voltage produced. Slightly above the horizontal "On" line is a second horizontal line labeled "Saturate" which indicates the negative voltage level at which the slicer 16 saturates. Signals having magnitudes less than "On" level will not produce a signal at the output of the slicer 16. This eliminates much of the noise which may be generated in the system. The remaining distortions are, however, not sufficient to introduce significant error into the final output. The output of the slicer 16 is thus in the form of spaced, half cycle square waves or pulses as shown in graph (d).

While the wave form of graph (d) looks much like the negative portion of graph (a), the two are materially distinguishable and it is not to be inferred that an attempt has been made to reproduce the form of the magnetization pattern. The two waves are out of phase and the duration of individual half cycles of graph (a) are greater than those of graph (d). The two waves do have one characteristic in common, however; the time between the leading edge (right hand edges as shown) of one half cycle and the leading edge of an adjacent half cycle in both pulse trains is the same. Since the leading edges of the negative half cycles of graph (a) represent the beginning of dialing contact open periods, the wave of graph (d) contains information which the multivibrator 19 can use to open the dialing contacts 13 at correctly spaced intervals. By opening the dialing contacts 13 at correctly spaced intervals by virtue of the signal shown in graph (d) and maintaining them open a precise length of time by virtue of the multivibrator 19, the pulse train placed on the telephone line will be comprised of pulses and intradigital times which meet the required standards.

The wave of graph (*d*) has one defect, however, which must be eliminated before it can be used to operate the multivibrator 19. The blip 26 must be inhibited since it can produce one output pulse more than the number desired. There are a number of ways in which blip 26 can be eliminated, and they include mechanical as well as electronic methods. One way of preventing the blip from causing an inaccurate dialing signal is to prevent its reproduction. If the head 12 is placed a certain distance from the left edge of the tape when it begins the process of recording a number into the magnetic storage unit 11, then placing the head 12 a greater distance from the edge of the tape when beginning a dialing cycle will avoid the head 12 reading the initial flux level change which causes the blip to be created. Besides the blip, however, there are other unwanted signals which may exist prior to the first dialing pulse from sparks which are produced when current is initially switched into the head drive motor, by the rather erratic manner in which the head drive motor mechanism operates before it reaches its scanning speed, by initial switch transients, etc. Thus, while the blip 26 may be eliminated by positioning the head 12 properly, the other initial disturbances cannot be fully eliminated in this manner.

Even though the possibilities of a false signal being generated from the first part of the tape signal are somewhat diminished when the above method of eliminating the blip 26 is employed, the present invention is designed to guard against all possibilities of error and thus employs an electronic inhibitor 17 to prevent both the blip 26 and first part of the tape signal from generating erroneous dialing signals. When the inhibitor 17 is on, signals cannot get through from the slicer 16 to the multivibrator 19. When it is off, the inhibitor 17 acts like a simple connector between the slicer 16 and the multivibrator 19 and in no way affects the signal. When the switch 23 is pushed to start the head 12 traveling across the tape, the inhibitor 17 is automatically turned on and all signals generated in the head 12 and amplifier 14 before the inhibitor 17 turns off are prevented from reaching the multivibrator 19. The inhibitor 17 is designed to remain on a sufficient length of time to eliminate all of the signal which precedes that induced by the first negative magnetization area. Even if a portion of the signal induced by the first negative magnetization area is eliminated by the inhibitor 17, the desired signal will still be correctly placed on the telephone lines, as will be explained below.

The signal which appears at the output of the inhibitor 17 is almost perfectly suitable to operate the multivibrator 19 at the required intervals. The time between the leading and trailing edges of the square waves of graphs (*d*) and (*a*) (determined by where slicer 16 extracts information from the signal of graph (*c*)) is shorter than the time which the multivibrator 19 holds contacts 13 open. Thus, when the multivibrator cycle ends, the contacts will be closed. If the trailing edge of the square wave were, for some reason, distorted so as to have a time period greater than the multivibrator cycle time, however, the contacts would not close at the proper time, and the multivibrator 19 would operate for another cycle. This, of course, would result in the transmission of an incorrect designation code. While the possibility of malfunction occurring for the reason set out above is unlikely, the present invention is designed to eliminate the possibility altogether.

The signal at the output of the inhibitor 17 is passed through differentiator 18 before reaching the multivibrator 19. As is well known, the differentiation of a square wave results in positive and negative pulses occurring alternately and at intervals equal to the time between leading and trailing edges of the square wave. The signal illustrated in graph (*f*) is thus the signal appearing at the output of the differentiator 18. The multivibrator 19 is designed to be responsive to positive pulses only (it could be designed to respond to negative pulses alternatively) so that the only effective part of the output of differentiator 18 is that shown in graph (*f*). Each pulse of graph (*f*) is generated by the leading edge of the signal of graph (*e*) and will thus operate the multivibrator 19 at intervals equal to the time between the leading edges of the square waves. As shown above, this interval is equal to the interval between the leading edges of negative magnetized areas on the tape. The phantom lines in graphs (*c*), (*d*), (*e*), (*f*) and (*g*) illustrate the error which would occur if an extra half cycle was not provided by the amplifier 14. Thus, the information recorded on the tape is used to directly operate the dialing contacts 13; and the means employed are precise, dependable and straightforward in operation.

A comparison of graph (*g*) and graph (*c*) illustrates which portion of the head signal results in the signal used to operate the multivibrator 19—the last portion of each full cycle. Thus, if the inhibitor 17 prevents a portion of the signal which is generated by the first negative magnetization area from reaching the multivibrator 19. Operation will in no way be adversely affected, as long as the last portion of the signal gets through. Another advantage which accrues to using only the last portion of each cycle is the avoidance of the distortions in the initial cycle.

Figure 3:
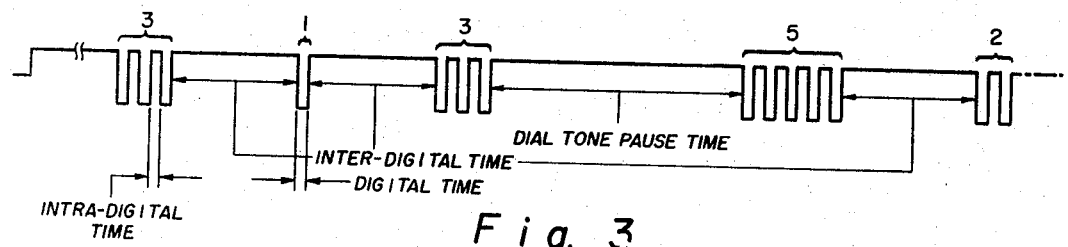
FIG. 3 illustrates a partial station designation code as it appears either on a magnetic memory or a set of telephone wires.

FIG. 3 illustrates the magnetic pattern representing an area code, a dial tone pause, and the first two digits of a conventional seven digit station code. FIG. 3 is also illustrative of the pulse pattern to be sent out over the telephone lines in calling a station in the code area 313 and whose local code has the first two digits of 52. Viewing the pulses as the pattern on the magnetic tape, it can be seen that the rise from no magnetization to positively directed magnetization at the beginning (left hand edge) of the pattern is the only such magnetization change. All other changes in magnetization go from either positive to negative, or vice versa, and form part of a negative pulse. Thus, the only interfering blip to be expected is blip 26 (FIG. 2) and it is well taken care of by inhibitor 17 as discussed in detail above. The first positive magnetization area on the tape is of the same length as an inter-digital separation for reasons which will be set forth in detail below.

The tape is effectively erased when it is magnetized in a positive direction since this represents the dialing contacts 13 in an inactive position (as defined above). Thus, a new code can be placed on the tape at the same location as an old code by the head 12 magnetizing all unwanted negative areas positive and thereby erasing them. This not only enables new designation codes to be entered in place of old ones, but eliminates the necessity of a separate erasing operation.

Viewing FIG. 3 now as a pulse train (time increasing from left to right), all time intervals likely to occur are included in the part of the designation code illustrated.

The head 12 will read the first three digits in response to pushing start switch 23 and then stop (the timer 21 on-time running out before the first negative area of the digit 5 is read). When the dial tone is detected by the telephone user, the start switch 23 is again activated, the inhibitor 17 turned on, and the head 12 started reading again. The inhibitor 17 will turn off just before the first digit pulse of the digit 5 is read, and the head 12 will continue to automatically read the rest of the code.

The amount of time required to obtain dial-tone signal after an access or trunk code has been dialed is not of any fixed duration. It may take only a few milliseconds or it may take more than ten seconds; the conditions which exist at the central office at the moment determine the time required. It is possible to have a dialer transmit a code which includes a dial-tone pause without requiring a second manual operation. This is done by designing the timer 21 on-time to exceed the maximum time expected to receive a dial-tone signal. This type of operation, however, has two serious drawbacks which far outweigh the slight saving of physical effort. By placing the entire dial-tone pause period on the tape, the user is required to wait the maximum time anticipated, even when a dial-tone signal is in fact received in the minimum time. This also uses up a large portion of the tape. The most serious drawback, however, is the possibility of error which such operation introduces. Being that there is a practical limit to the maximum pause time which can be placed on the tape, the occasion will arise where the dialer will begin to dial the local code before a dial-tone signal is reached, thus generating an incorrect signal. The present invention eliminates all of these disadvantages which can accompany a dial-tone pause by the simple requirement of a second manual actuation of the start switch 23.

It is not necessary when recording a new code in a previously used location to erase all of the old code from the tape, provided the new code is followed by a section of positively magnetized tape at least as long as that inserted to give a dial-tone pause. It should be noted that even when recording at a location not previously used it is necessary that the last digit pulse be followed by a dial-tone pause space if a blip caused by the magnetization of the tape going from positive to zero is to be avoided.

Figure 4:
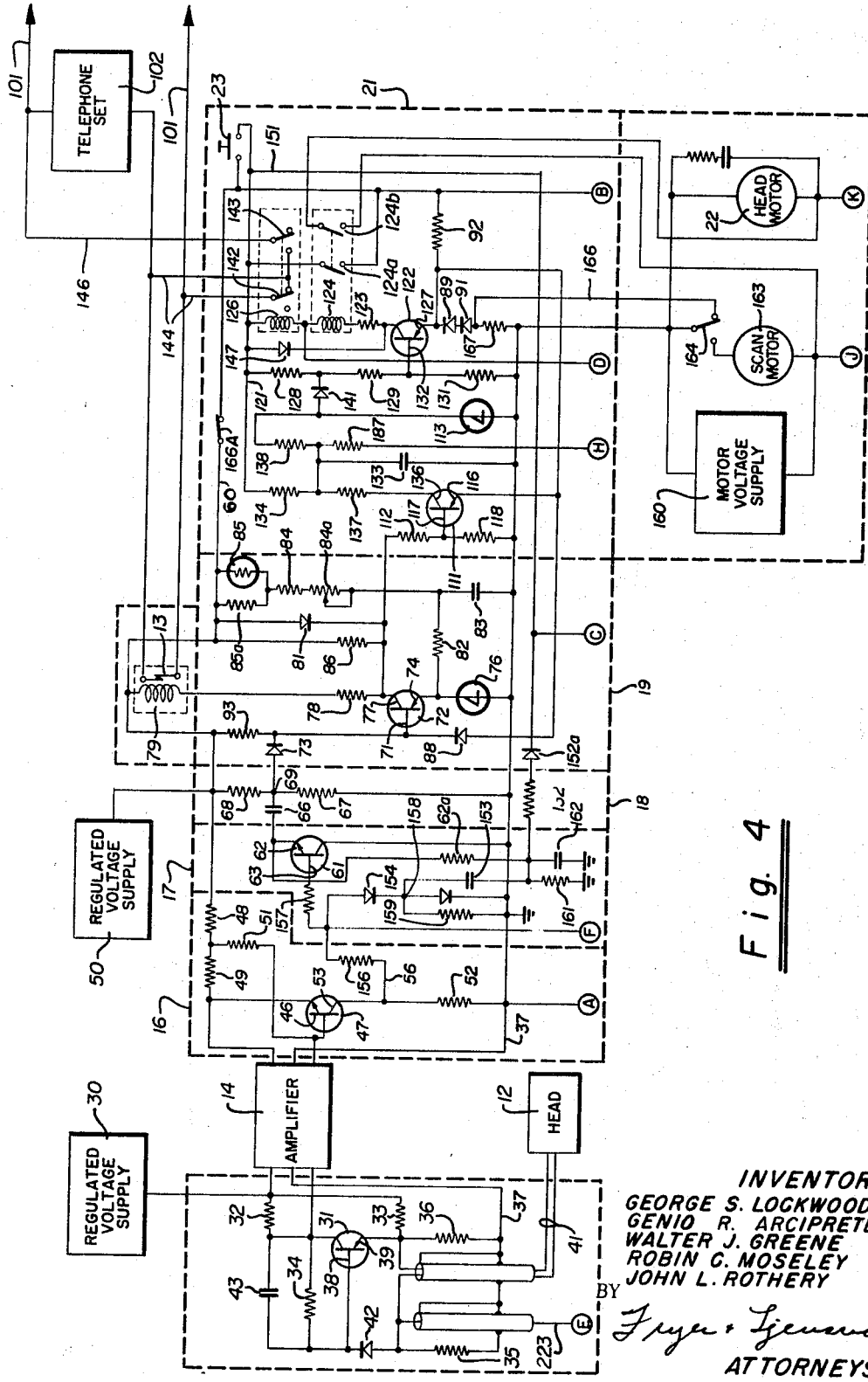
FIG. 4 is an electrical schematic diagram of the block diagram of FIG. 1.

The following description, made with reference to the schematic circuit diagram of FIG. 4, explains in detail the manner in which the invention provides the operation described above. The magnetic head 12 is electrically disposed in the emitter-base loop of a transistor 31 which serves as the input stage of amplifier 14. A current generated in head 12 changes the voltage at the base of the transistor 31, thereby creating a signal which is increased in magnitude by the amplifier. Amplifier 14 is designed to be capable of operation at very low frequencies (5 to 20 c.p.s.), stable in operation, have a minimum of self generated noise and operate to filter out noise on the head signal.

The first stage of the amplifier 14 represented by transistor 31 is shown in detail due to the rather unique manner in which the head 12 is coupled into the amplifier. Resistors 32, 33, 34, 35 and 36, along with diode 42, establish a biasing network between a regulated voltage supply 30 and a line 37 at ground potential to render the transistor 31 conducting. A pair of shielded leads 41 connect the head 12 between the emitter 39 and base 38 of the transistor 31. If the head 12 were the only element in the emitter-base loop, the same negative voltage which exists across the base emitter junction would necessarily exist across the head, as well, causing a current to flow therein. FIG. 4 illustrates the electronic circuit of the present invention in the condition which it assumes when the automatic dialer is employed to read the information on the tape (dialing cycle), as opposed to writing information on the tape (recording cycle), thus requiring that the head 12 have signals induced in it by scanning over the magnetized areas on the tape. For this purpose it is not necessary to have a large current flow through the head 12 and it is, as a matter of fact, necessary that the current flow through the head 12 be kept below a specified magnitude if the information existing on the tape is not to be erased as the head 12 passes over it.

The head 12 has a low impedance (approximately 200 ohms) so that relatively small voltage drops across the head cause intolerably high currents. If an element is placed in the base-emitter loop to increase the impedance around the loop so as to prevent these high currents, there is the problem of the element attenuating the signal generated in the head to such a low magnitude as to make it unusable. A capacitor put in the loop would prevent the high currents from being generated in head 12 by the base emitter biasing voltage, but would have to be of an inconveniently large size to provide the necessary impedance, and could introduce recovery problems after the record process. A resistor would have a more reasonable size but would attenuate the signal materially. The present invention avoids the disadvantages of both the capacitor and resistor as current limiting devices by using a diode in such unique manner. A diode is placed in series with the head 12 and oriented so as to be forward biased. The non-linear forward impedance characteristic of the diode 42 is thus exploited to satisfy the needs of the present invention.

Figure 5:
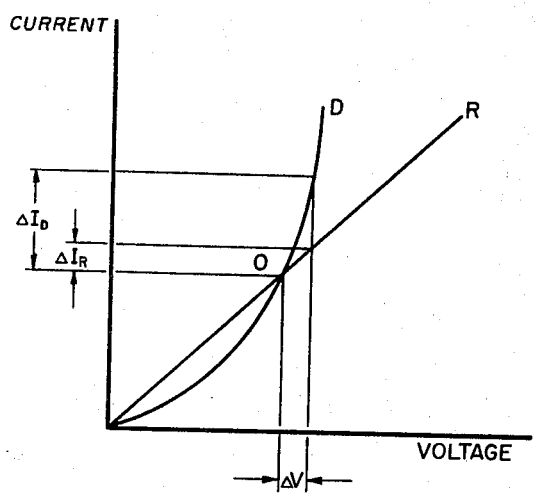
FIG. 5 is a current vs. voltage graph illustrating the characteristics of a resistor and diode.

A comparison of the impedance characteristics of a resistor and a diode is illustrated in the graph of FIG. 5. Point "0" on the graph represents the base emitter biasing voltage which is established to properly condition the transistor 31 into a conducting state. The straight line labeled "R" is the voltage-current characteristic of a resistor having the necessary impedance to prevent excessive head current. Diode 42 is selected to have a current vs. voltage characteristic (forward direction) which passes through the operating point "0" on the resistance line. Thus, when the transistor 31 is properly biased, but no signal exists on head 12, both the resistor and the diode 42 provide the same impedance in the base-emitter loop and are for all prictical purposes, under these conditions, indistinguishable. The difference in operation occurs when a signal is generated in the head 12. It is seen from the graph that a signal having a voltage $\Delta v$ produces an increased current flow in the base-emitter loop of $\Delta I_R$ in the case where a resistor is used as an impedance element, and an increased current flow of $\Delta I_D$ when the diode 42 is used. While both elements give substantially linear operation over the operating range, the diode 42, as the graph plainly shows, gives a much larger current change per voltage change than does the resistor. Thus, the diode 42 provides the function of the resistor with reduced attenuating effects. By proper choice of resistors 32 through 36, the D.C. current through the head 12 during the playback process may be reduced to zero by balancing the bridge network formed by the diode 42 and resistor 35 and the base-emitter diode of the transistor 31 and resistor 36.

Besides taking advantage of the impedance characteristic of the diode 42, advantage is also taken of its characteristic as a solid state device. By having a solid state device in the base-emitter loop it is found that effects in variations in characteristics of the transistor 31 due to temperature tend to be compensated for by the changes which also occur in the diode 42. Thus, the diode 42 as disposed not only operates as an impedance element but also as a stabilizing element.

Capacitor 43 connected between the collector and base of transistor 31 provides high frequency A.C. feedback to shape the gain frequency response. Resistor 34 besides acting as a biasing resistor also provides a path for D.C. and A.C. feedback to increase the stability of the amplifier 14. Further since the amplifier 14 has an upper cut-off frequency of approximately 20 c.p.s., only the fundamental frequency of the signals out of the head 12 appears at the output of such amplifier. That is, a substantially sinusoidal waveform at 10 c.p.s. appears at the output of the amplifier 14.

The output from the amplifier 14 is delivered to the base 46 of a transistor 47. Resistors 48, 49, 51 and 52 provide a biasing network between a regulated voltage supply 50 and ground line 37. The biasing network maintains transistor 47 in a non-conducting state, so that only by applying signals from the amplifier 14 which turn on transistor 47 can an output be induced on collector 53. Since the transistor 47 is biased off, the only signals which will turn it on are those having a polarity which tends to drive the transistor 47 into conduction. Not only must a signal be of the proper polarity to induce an output at collector 53, it must also be of a magnitude sufficient to overcome the threshold voltage (the voltage required to turn the transistor 47 "on") before an output signal is generated. Transistor 47 further has the characteristic (due to the manner in which it is employed) that the difference between the input voltage required to just turn it on and that needed to saturate it is small by comparison with the signal levels normally achieved. These characteristics of transistor 47 give it the ability to slice out a portion of the signal which comes from the output of amplifier 14, thus providing the slicing function described above (see FIG. 2). The output signal from the slicer 16 appears on conductor 56 which is electrically connected to collector 53 and which leads to the inhibitor 17.

Emitter 62 is connected through resistor 62a to a capacitor 162 which, as will be explained fully below, is only charged when start switch 23 is actuated. Thus, transistor 61 will be biased so as to be able to pass signals when the timer is energizing the head drive means 22; which is the only time when signals properly should pass through transistor 61. This provides an added safety feature to prevent extraneous signals from causing misdialing. A further safety feature is provided by a delay in transistor 61 turning "on" after switch 23 is closed and the timer energized due to the charging time of capacitor 162. This delay prevents any extraneous signals produced by the mechanical contacts of switch 23 from passing through transistor 61 and causing a dialing error. The operation of the inhibitor 17 is best described after the rest of the circuit has been set forth and will thus be considered at this time to be in a state which enables the signal to pass uninterrupted from the collector of transistor 47 to the emitter of transistor 61.

A capacitor 66, connected to emitter 62, is in series with a resistor 67 which is connected to ground line 37. A voltage is maintained at junction 69 between capacitor 66 and resistor 67 by means of resistor 68 connecting the supply 50 thereto. Capacitor 66 and resistor 67 form the previously discussed differentiating circuit 18. Thus, the voltage which appears at the junction point 69 is the differential of the voltage at the emitter 62 of transistor 61 superposed on a D.C. voltage. Only the positive pulses are, however, transmitted to the base 71 of transistor 72 through connecting diode 73.

The emitter 74 of transistor 72 is connected to ground line 37 through a four-layer diode 76, while the collector 77 is connected through a current limiting resistor 78 and a coil 79 to the voltage supply 50. Coil 79 is a relay coil and controls dialing contacts 13. Four-layer diode 76 and transistor 72 are biased so as to be normally conducting so that current flows through coil 79 maintaining dialing contacts 13 closed under normal conditions. Transistor 72 becomes non-conducting when a signal of proper polarity and sufficient magnitude is received on the base 71. Half of the signals which are generated at the output of the differentiator 18 are of the proper polarity and magnitude (see FIG. 2, graph (g)) and will therefore cause the transistor 72 to become non-conducting. Upon being rendered non-conducting the transistor 72 no longer draws current through its collector and the coil 79 thereby becomes de-energized allowing the contacts 13 to open.

A diode 81 is connected across coil 79 and resistor 78 to prevent damage to transistor 72 from inductively generated voltage when the coil is de-energized.

Figure 6:
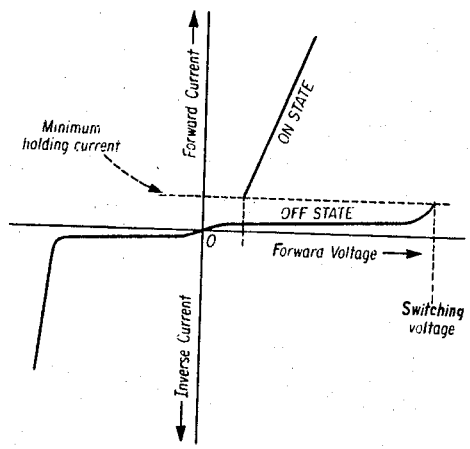
FIG. 6 is a current vs. voltage graph illustrating the characteristics of a four-layer diode.

The length of time which the transistor 72 remains non-conducting, once turned off by a pulse from the differentiator 18, is determined by a timing circuit which for the most part comprises four-layer diode 76, resistor 82, capacitor 83, resistor 84, resistor 84a, resistor 85a and thermistor 85. The four-layer diode 76 has the current voltage characteristic illustrated in FIG. 6. The four-layer diode 76 is seen to have a very large resistance (a number of megohms) when it is in its nonconducting state, until a sufficient voltage is placed across it (switching voltage) at which time the four-layer diode 76 turns on, becomes conducting, and has a very small resistance (about 10 ohms). Thus, in the normal state the four-layer diode 76 and transistor 72 are conducting and the current passes through the four-layer diode 76 operating it on the forward current portion of its current-voltage characteristic curve. When the transistor 72 is turned off by a signal received from the differentiator 18, however, the current through the emitter leg of the transistor 72 becomes less than the minimum holding current of the four-layer diode 76 so that that diode switches to its nonconducting state.

The four-layer diode 76 is thus seen to be usable as a switch which is operable by a change in voltage not requiring a change in polarity. The four-layer diode 76 has a number of characteristics which make it especially suitable as a time switch in the present invention; it has a very fast switching time, it operates at relatively low voltage levels, is stable in operation at a given temperature, etc. The four-layer diode 76, however, is not the only device capable of switching the transistor 72 at the appropriate time. Thus, it is to be understood that the invention is not specifically limited to the use of four-layer diodes. Devices which could be substituted for the four-layer diode include relays, transistors, and other solid state devices.

The capacitor 83, connected to the ground line 37 at one end and to four-layer diode 76 through resistor 82 at its other end is unable to maintain a sizeable charge when the four-layer diode 76 is in its conducting state. As soon as the four layered diode 76 becomes non-conducting, and thus a high impedance, capacitor 83 will begin to charge up through resistors 84, 84a, 85a and thermistor 85 which are all connected between the capacitor 83 and the supply 50. When enough charge is accumulated on the capacitor 81 to create a voltage across its four-layer diode 76 equal to the switching voltage, the four-layer diode 76 will switch to its conducting state thereby switching transistor 72 back on and once again provide coil 79 with energization for maintaining dialing contacts 13 closed. A resistor 86 is connected between the collector 77 of transistor 72 and the supply 50 to provide a current path in addition to that of coil 79 and thereby insure that sufficient current is drawn through the four-layer diode 76 to maintain it in its conducting state when the transistor 72 is conducting.

Thus, the instant that a positive pulse is received from the differentiator 18 the multivibrator 72 switches to its off-normal state opening contacts 13. The length of time which the dialing contacts 13 remain open is dependent upon the length of time it takes for coil 79 to become re-energized which in turn is dependent upon the time which it takes for capacitor 83 to charge up sufficiently to switch four-layer diode 76 back on. This latter time is dependent upon the RC time constant of resistors 84, 84a, 85a, thermistor 85 and capacitor 83 and can be set to any desired time, within given limits. Once the desired time is set by the proper setting of variable resistor 84a the length of time required to switch on four-layer diode 76 will remain sufficiently constant to meet the most stringent time requirements of telephony. Since the signal which turns transistor 72 off is a pulse, rather than a square wave, all possibility that the signal will still be on the base when the four-layer diode 76 switches back to its conducting state is eliminated.

The statement made above that the time required for capacitor 83 to charge up sufficiently to switch four-layer diode 76 is a constant once the resistor 84a is set, assumes constant temperature conditions. Changes in temperature cause changes in the leakage current of capacitor 83, leakage current of transistor 72, changes in resistor values, changes in supply voltages and most important, changes in the switching voltage of four-layer diode 76. Any system of this kind which is to be put in widespread use must be able to function properly within a wide temperature range (e.g. from 20° F. to 120° F.). Within this range the switching voltage of the four-layer diode 76 may vary as much as 20% in either direction. Unless compensated for, this amount of variation in switching voltage results in more deviation in pulse length than allowed by most industry standards. Stabilizing a transistor multivibrator circuit (all of the components, not only the transistors, change value with temperature change) over the temperature range set out above, has created such serious and insurmountable problems in the past that such circuits have been considered unsuitable for telephone station purposes.

One of the outstanding features of the present invention is the temperature stable multivibrator which forms part of the teaching of the invention. Without temperature stability, the most critical element in the entire system would introduce intolerable error into the output dialing signal and thereby render the dialer substandard. The advantageous use of a temperature responsive element such as a thermistor 85 in combination with a positive coefficient four-layer diode 76 and transistor 72, provides a truly unique and advanced multivibrator which is sufficiently temperature stable to meet the stringent requirements of the telephone industry. (If the four-layer diode has a negative temperature coefficient, a positive temperature coefficient compensating element would be used in place of a thermistor.)

To compensate for a positive temperature coefficient of four-layer diode 76, thermistor 85 in parallel connection with a compensating resistor 85a is connected in series with resistors 84 and 84a. The proper choice of a resistor 85a enables the negative temperature coefficient of thermistor 85 to be effectively altered to properly compensate for the positive temperature coefficient of the four-layer diode 76 (and other disturbances; see above) over the entire range.

When the transistor 72 and four-layer diode 76 are in their conducitng states, emitter 74 is maintained at a slight negative potential (four-layer diode 76 having very small impedance in its conduction state). Base 71 is designed to be biased at a larger negative potential than the emitter 74 by the arrangement of biasing resistors 93, 68 and 67. (The present circuit employs negative voltages to properly bias the pnp transistors. If npn transistors are employed the polarity is reversed.) This establishes the necessary emitter-bae voltage drop to maintain the transistor 72 in the conducting state. The signal from the differentiator 18 is comprised of a series of negative and positive pulses (see FIG. 2, graph (f)). The negative pulses will have no effect on the state of the transistor 72 since they are clipped by the diode 73. The peaks of the positive pulses, however, will have the effect of reversing the potential drop across the emitter base junction, thereby driving the transistor 72 into a non-conducting state. As previously described, the four-layer diode 76 responds to transistor 72 being in the non-conducting state by itself switching to the non-conducting state. While the four-layer diode 76 will remain in its non-conducting state for the time required for capacitor 83 to charge up, transistor 72 could quickly revert to its conducting state if after the brief time that the positive pulse is present on its base 71, the emitter base junction became forward biased. Even if this did not give rise to sufficient current to energize coil 79, it would speed up the charging of capacitor 83 and thus give an inaccurate signal. Such a situation will occur if the base 71 is allowed to go sufficiently negative to create a positive emitter-base potential drop. Diodes 88, 89 and 91 are employed to prevent the base 71 from going more negative than emitter 74 during the non-conducting state of four-layer diode 76. Diodes 89 and 91 are connected through a resistor 92 to supply line 60, and oriented so that the supply line voltage causes them to be forwardly biased. In this manner the juncture between diode 89 and diode 88 is maintained at a finite potential with respect to ground line 37 to which diode 91 is connected. Whenever the voltage on base 71 attempts to be more negative than the small negative potential at the anode of diode 88, diode 88 will become forward biased and the base will be unable to support a negative voltage greater than the voltage required to forward bias the three diodes 88, 89 and 91. (The series combination of diodes 89 and 91 is employed to give twice the voltage at the cathode of diode 89 that there would be if diode 89 were employed alone.)

In this manner emitter 74 is maintained at a greater negative potential than base 71 throughout the recovery period of four-layer diode 76. When the potential on capacitor 83 becomes sufficient to switch four-layer diode 76 into its conducting state, the negative potential on emitter 74 will automatically drop to the small negative potential which exits across the four-layer diode 76 when it is in its conducting state. This potential is of less magnitude than the potential maintained on base 71 by diodes 88, 89 and 91, thus causing the transistor 72 to be biased into its conduction state simultaneously with the four-layer diode 76 switching back to its conduction state.

Thus, transistor 72, four-layer diode 76 and the components associated therewith provide a timed switch which maintains dialing contacts 13 open a precise length of time which is independent of the duration of the signal which initially activates the switch. The recovery period of four-layer diode 76 is, of course, shorter than the time between positive pulses from the differentiator 18 so that between positive pulses the transistor 72 will be turned off, the dialing contacts 13 opened, the capacitor 83 charged up, the four-layer diode 76 switched back on, the transistor 72 switched back on, and dialing contacts 13 closed. The next positive pulse will induce the same cycle of events.

The dialing contacts 13 are placed in series with one of the telephone lines 101 leading to the telephone instrument 102. The telephone operates in the well known manner whereby means are provided for establishing a complete circuit through which current flows when the telephone is conditioned for dialing (such as by lifting a receiver off of its support). The dialing contacts 13 interrupt this current flow and thereby place a signal on the lines to which the central office switching equipment not shown responds. Thus, each time transistor 72 is turned off a pulse of the proper duration will be placed on the telephone line 101.

The collector 77 of transistor 72 is tied to the base of a transistor 111 through a current limiting resistor 112. Transistor 111 along with a four-layer diode 113 and the several components associated therewith form the timer 21 which is responsible for furnishing energization to head drive means 22. The emitter 116 of transistor 111 is connected directly to the cathode of diode 89 so as to be maintained at a small negative voltage relative to ground line 37. The base 117 of transistor 111 will be maintained at a very slight negative voltage with respect to ground line 37 when transistor 72 is in its normal conducting state. Thus, the emitter is maintained at a greater negative voltage than the base 117 and transistor 111 will thereby be normally biased in a non-conducting state. The operation of the timer 21 is most easily understood with reference to the activity which occurs after start switch 23 has been pushed.

Start switch 23 is interposed in series with supply line 60 from voltage supply 50 and a common conductor 121. The switch 23 is normally open so that the supply voltage is not present on the conductor 121. When the switch 23 is pushed or activated, however, the full supply voltage is connected to common conductor 121 so that a transistor 122 which has its collector connected to common conductor 121 through a current limiting resistor 123 and a pair of series connected coils 124 and 126 will draw current. As current passes through coils 124 and 126, the contacts associated therewith will be activated to their off-normal positions. Coil 124 has associated therewith a pair of relay contacts 124a and 124b, both of which are normally open. Contacts 124a serve as a clamp so that once transistor 122 is rendered conducting and current flows through coil 124, the release of start switch 123 will not disconnect line 121 from the supply line 60. This is accomplished by having one of contacts 124a connected to line 121 while the other is connected to line 60. Once line 121 is so clamped to line 60, the only way in which line 121 can be electrically separated from the voltage supply is by transistor 122 being driven into a non-conducting state so as to prevent current flow through coil 124, causing contacts 124a to open.

The bias of transistor 122 which enables it to be conducting immediately upon the occurrence of the supply of voltage on line 121 is established by virtue of diodes 89 and 91 connected to the emitter 127 and biasing resistors 128, 129, and 131, the first two of which connect the base 132 to line 121 while the last mentioned resistor connects the base to ground line 37.

Once a voltage is established on line 121, a capacitor 133 which is connected to line 121 by a resistor 134 will begin to accumulate charge. Collector 136 of transistor 111 is connected to the junction between capacitor 133 and resistor 134 by means of a resistor 137 and provides a path (when the transistor 111 is in the conducting state) that the capacitor 133 can discharge through. A resistor 138 connects capacitor 133 to the anode of four-layer diode 113 which has its cathode connected to ground. If capacitor 133 accumulates enough charge to create a voltage across four-layer diode 113 equal to or greater than the switching voltage of the diode, the normally non-conducting four-layer diode 113 will become conducting. The time required to build up sufficient charge on capacitor 133 to switch four-layer diode 113 into a conduction state is proportional to the RC time constant determined by the values of resistor 134 and capacitor 133. The basic requirement on the time required to charge capacitor 133 sufficient to switch the four-layer diode 113 is that it be greater than the minimum inter-digital time.

The anode of four-layer diode 113 is connected through a diode 141 to resistor 129 which in turn is connected to the base 132 of transistor 122. When the four-layer diode 113 is in its conducting state, the voltage at the base 132 of transistor 122 is less negative than the voltage on the emitter 127 thus causing the transistor 122 to be in a non-conducting state resulting in the deenergization of coils 124 and 126 causing contacts 124a to unclamp line 121 from supply line 60.

The only manner of preventing capacitor 133 from charging up sufficiently to create a switching voltage across four-layer diode 113 is to create a discharge path for the capacitor 133 at a time prior to its reaching the switching voltage. As previously indicated, transistor 111 provides a discharge path for capacitor 133 when the transistor 111 is in a conducting state. Transistor 111 will be driven to a conducting state when the base 117 is driven to a greater negative voltage than the emitter 116. This will occur each time that transistor 72 switches from a conducting to a non-conducting state. This follows from the fact that when transistor 72 is conducting the voltage at its collector 77, to which the base is transistor 111 is connected, is at a very low negative voltage which very quickly becomes a large negative voltage when the transistor 72 is switched off. Transistor 111 will be held in a conducting state for the entire duration of the charging time of capacitor 83 after which time it will return to its non-conducting state and capacitor 133 will begin to charge. If another pulse is received by the base 117 of transistor 111 prior to the time the capacitor 133 charges up to the switching voltage of four-layer diode 113, the capacitor 133 will again be discharged, a new cycle started, and contacts 124a maintained closed.

While a transistor and four-layer diode provide the most advantageous means for forming timer circuit 21, the circuit is not limited to use of these particular components. The basic components of the circuit include means for accumulating electrical energy and establishing a voltage which is a function of the energy accumulated (a capacitor being best suited for this function), switching means which responds to a voltage above a certain value to change conduction states (i.e. a four-layer diode, relay, transistor, etc.) and means for discharging the energy accumulating means in response to electrical signals. When these general components are arranged and operated as taught above, they provide a novel timer having several advantages, especially with regard to its use with the automatic dialer herein.

Besides the clamping by contacts 124a energization of coil 124 results in the closure of contacts 124b. One of contacts 124b is connected to the head drive 22 while the other contact is connected to a motor power supply 160. Thus, as long as transistor 122 is conducting and coil 124 energized, head drive 22 will be energized and cause the head 12 to scan the tape of the magnetic storage unit 11.

Coil 126 has associated therewith a set of normally closed contacts 142 and a set of normally open contacts 143, the first set of which provides a safety device while the second results in the telephone being shunted. In the event of a general power failure, the flow of current which normally energizes coil 79 and maintains dialing contacts 13 open would stop and dialing contacts 13 would be opened. This would prevent the normal use of the telephone which might very well be unaffected by the power failure. To prevent this situation, normally closed contacts 142 are connected to conductors 144 which shunt dialing contacts 13. When dialing contacts 13 are to be used to dial, however, the contacts 142 will be automatically open so that the shunt across the dialing contacts 13 will be effectively removed.

The contacts 143 are connected to a line 146 which shunts the entire telephone instrument so that when the contacts 143 are closed no signal can be detected through the earphone of the telephone. This is a highly desirable feature since it prevents annoying clicking from being transmitted into the ear of the telephone user while the telephone is being dialed. As soon as the complete station designation code has been dialed (or the head 12 comes to rest) the coils 124 and 126 will be de-energized so that the contacts 143 will open to effectively remove the shunt across the telephone and thereby enable the subscriber to carry on a conversation or receive a dial tone signal, etc. In order to prevent the same type of inductive kick described with reference to coil 79, a diode 147 is placed in parallel with the series connected coils 124 and 126 and resistor 123.

Another consequence of activating start switch 23 is placing the full negative voltage of supply line 60 onto line 151 which leads to inhibitor 17. Line 151 leads to the series connection of resistor 152 and diode 152a which is connected to a capacitor 153 which is in turn connected to a diode 154 which connects to line 56 through resistor 156. Line 56 connects resistor 156 to the collector 53, of transistor 47 which is in fact the output of the slicer 16. Thus, when the start switch 23 is closed the cathode of diode 154 will be driven to the voltage of supply line 60 which is necessarily more negative than any voltage which can appear at the anode of diode 154. The anode of diode 154 is also connected to a resistor 157 which serves as a current limiting resistor for the the base 63 of transistor 61. Since diode 154 will be forward biased by the application of the supply line voltage at its cathode, the output of the slicer 16 will be effectively tied to the junction 158 between diode 154 and capacitor 153. Negative pulses which appear at the output of the slicer 16 at the time when the inhibitor 17 is so tied to junction 158 will be then incapable of turning off transistor 72. Thus, as long as the junction 158 is maintained at a negative voltage greater than the pulses at the output of the slicer 16, the output of the slicer will be unable to effectively reach the multivibrator 19 which controls the dialing contacts 13. The length of time which the inhibitor 17 is effective in preventing the output of the slicer 16 from reaching the multivibrator 19 is dependent upon the length of time which it takes capacitor 153 to discharge so that the negative voltage at junction 158 is less than the magnitude of the negative pulses from slicer 16. When the pulses from slicer 16 are of greater magnitude than the negative voltage at junction 158, diode 154 will be reverse biased and the inhibitor 17 will be effectively disconnected from the junction 158 between the slicer and emitter follower circuit of transistor 61. This time is governed by the time constant of capacitor 153 and resistor 159. The time of effective inhibitor action will be set so as to keep out as much signal as possible without causing a loss of necessary information.

The voltage which is placed on line 151 when start switch 23 is initially closed is a number of small impulses caused by the bouncing of the mechanical contacts which form switch 23. In order to prevent unwanted triggering of the multivibrator 19 by these impulses a smoothing circuit comprising resistor 152 and capacitor 162 is disposed between the switch 23 and capacitor 153. Diode 152a is provided in series with resistor 153 to prevent the charge on capacitor 153 from improperly re-energizing the timer 13.

In the same circuit with the head drive 22 and motor voltage supply 160 is a scan motor 163. The scan motor is used to drive the tape in the magnetic storage unit 11 in a manner set forth in assignee's copending application for "Reversible Power and Manual Drive," Ser. No. 234,610, filed Nov. 1, 1962. The scan motor 163 is set into operation through the use of a scan motor switch 164. When switch 164 is in its normal—unactivated—position, an open circuit exists between the motor 163 and ground line 37. In this position, however, the switch 164 does form connection between a shunt line 166 and line 37 so as to shunt a resistor 167 which is in series connection with diodes 89 and 91. When the scan motor switch 164 is in its unactivated position diode 91 is effectively grounded through line 166 and scan motor switch 164 so that resistor 167 has no effect on the voltage at the cathode of diode 89. When scan motor switch 164 is activated, however, to form a connection between scan motor 163 and line 37 it is necessary to disconnect line 166 from line 37 and thus remove the shunt across resistor 167. When resistor 167 is not shunted it becomes effective in determining the voltage at the emitter 127 of transistor 122. By the proper choice of value of resistor 167 the removal of the shunt thereacross can insure that the negative voltage at emitter 127 is sufficient to maintain transistor 122 in its non-conducting state regardless of the condition of four-layer diode 113.

When transistor 122 is maintained in its non-conducting state, coils 124 and 126 are de-energized which has the result, inter alia, of dialing contacts 13 being shunted. Thus, in summary it can be stated that whenever scan motor 163 is energized the dialing contacts 13 will be effectively removed from the telephone line 101. This insures that any pulses which may be picked up in the head 12 as a result of the flux generated by the scan motor 163 cannot transmit a faulty signal. Scan motor switch 164 also provides means by which the head 12 can be stopped once a dialing sequence has been selected and started. Thus, if the automatic dialer is in the middle of dialing a call and for some reason the user decides that it is not desirable to complete the call, the head 12 can be brought to rest and the call terminated by pushing scan motor switch 164.

Another safety feature which the invention employs is a limit switch 166A shown in supply line 60. This switch is controlled mechanically by the head 12 when the head reaches the far edge of the tape of the magnetic storage unit 11. Thus, if enough information exists on the tape to enable the head 12 to be driven to the far edge, the limit switch 166A will prevent the head 12 from going off the tape by disconnecting the supply 50 from line 121 and thereby opening contacts 124b which effectively remove motor voltage supply 160 from head motor 122.

To this point the invention has been described almost exclusively with reference to its operation in dialing out a station designation code which already exists in the magnetic storage unit 11. While it is the primary function of the present invention to dial code designations automatically, a most important part of any automatic dialer is the manner in which information is entered into a memory unit, and the means provided to perform this function. It will be noted in the description of the record means, which follows, that the present invention makes the most efficient use of components possible in that most of the components are used in both the dialing cycle and the record cycle. By so designing the circuit of the present invention to share components, the very important factor of cost is greatly reduced.

Before discussing the details of the record mechanism of the present invention, its general operation will be described with reference to the schematic drawing of FIG. 11. A record unit 170 electrically connects through detachable means to the previously described dialing circuit. The record unit 170 includes a standard dial mechanism comprising a dial wheel which is employed for the purpose of generating pulse trains representative of digits. Each time that a pulse is generated in the record unit, it is simultaneously delivered to the head 12 and the inhibitor 17. A pulse delivered to the head 12 causes a reversal in current through the head 12 and thus a reversal in the direction which the tape in the magnetic storage unit 11 is magnetized. A pulse delivered to inhibitor 17 passes through the inhibitor 17, to the differentiator 18, to the multivibrator 19 and then to the timer 21 which is turned on and energizes head drive 22. Thus, as long as pulses are received by the inhibitor 17 the timer 21 will maintain the head drive 22 energized so that the head 12 will be driven at a constant rate of speed across the tape, and the inhibitor 17 will continue to receive pulses as long as they are being delivered to the head 12. After the last pulse of a dialed digit is delivered to inhibitor 17, the head drive 22 will continue to be energized for a period of time equal to the on-time of timer 21, after which it comes to rest. Since the time which the head 12 moves after the last digit has been dialed forms a major part of the inter-digital time, the timer 21 is designed to have specific on-time. It will be shown below how the on-time of the timer is changed for the record cycle to be less than it is during the dialing cycle.

When a code includes a dial tone pause, this can be placed into the magnetic storage unit 11 in a simple manner. After the head 12 comes to rest (an inter-digital time will be the last information placed in the magnetic storage unit 11) the start switch 23 is operated to induce the head 12 to move for another inter-digital time period. The two inter-digital time periods combine to form a dial tone pause. After the entire code designation has been dialed, the start switch 23 is operated to place a pause period at the end of the code for the reasons set forth in detail above.

The record cycle employs the inhibitor 17, the differentiator 18, the multivibrator 19, the timer 21 (in modified form), and the head drive 22, thus giving these elements dual purposes. The ability of the present invention to provide this dual operation greatly decreases its overall cost and size.

Figure 8:
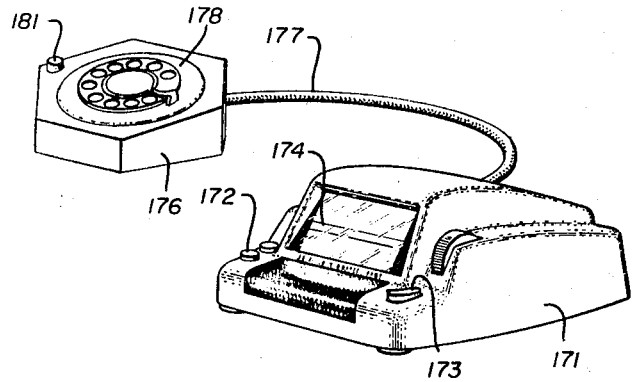
FIG. 8 is an isometric illustration of an automatic dialer of the present invention with the record unit attached.

Referring now to FIG. 8, a housing 171 contains the electronic circuit 100 of FIG. 4 as well as the magnetic storage unit 11, mechanical gearing and other components necessary for providing automatic telephone dialing. A pushbutton 172 operates start switch 23 and a rocker arm 173 operates scan motor switch 164. By pressing rocker arm 173 in the forward or reverse direction the magnetic storage unit tape is driven in a corresponding direction so that a previously stored station code call can be positioned within the two parallel lines 174. When so positioned, the head 12 and tape are properly aligned to enable the desired number to be automatically dialed.

A separate housing 176 is electrically connected to the circuitry contained in housing 171 through a cable 177. Housing 176 contains a standard dial wheel mechanism generally indicated at 178, and an electronic conversion circuit 200 described in detail below. The dial mechanism 178 includes dial contacts which are operated in the conventional manner. A light 181 serves as an indicator which informs the user when the magnetic storage unit is able to receive further information.

Figure 9:
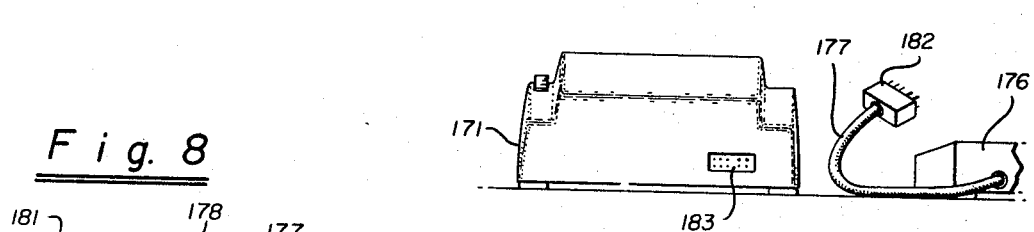
FIG. 9 illustrates the plug connection between the dialer and the record unit of FIG. 8.

Referring now to FIG. 9, a plug 182 connected to cable 177 mates with a plug receiving unit 183 mounted on the plug back of housing 171. The receiving unit 183 is electrically connected at a plurality of locations to the circuit 100 of FIG. 4 so that when the plug 182 and plug receiving unit 183 are joined, electrical continuity exists between the electrical components housed in housing 176 and those contained in housing 171. Since the dial wheel mechanism 178 and all those components associated therewith in housing 176 are only needed when it is desired to record new information into the magnetic storage unit 11 or erase information previously recorded, the entire unit can be detached and stored away when the automatic dialer is employed for the primary purpose of automatically dialing a telephone.

Besides forming electrical connections, it is altogether possible that the connection of plug 182 with the plug receiving member 183 could induce a mechanical change within housing 171 so as to automatically adjust any mechanical connections which must be altered for the record operation. Such a mechanical alteration might be relocating the stop which determines where the head 12 starts its initial scanning movement. As previously mentioned this is one manner of avoiding the initial blip due to the rise in magnetization from a zero level to a positive level. While this manner of avoiding the blip is not necessarily considered the most advantageous it is beneficial and through the use of plug 182 could be made to operate semi-automatically.

Figure 10:
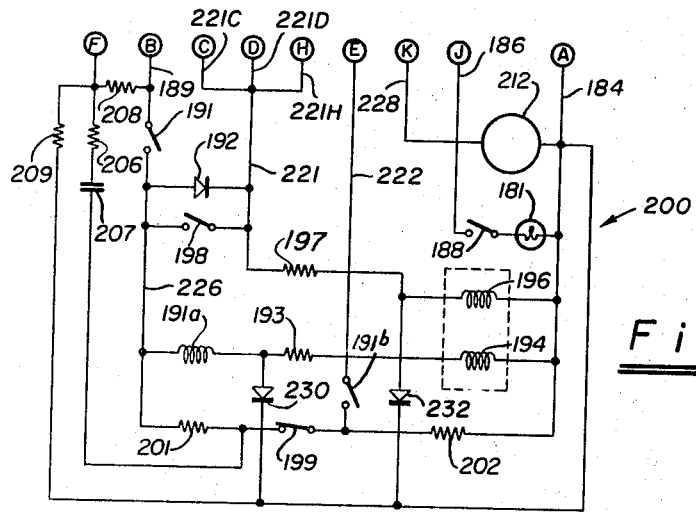
FIG. 10 is an electrical schematic diagram of the record unit of the invention.

Referring now primarily to FIGS. 10 and 4, the electrical circuit 200 which includes the dial contacts 199 of dial mechanism 178 has a plurality of connection points each identified by a different letter. Circuit 200 serves as a conversion means by which the circuit 100 of FIG. 4 is altered to enable it to respond to operation of the dial mechanism 178 to record appropriate magnetic space patterns in magnetic storage unit 11. Each connection point is electrically connected to a separate conductor in the cable 177 (see FIG. 8). The circuit 100 of FIG. 4 has the same number of connection points as circuit 200. Connection points of the two circuits which are electrically joined when plug 182 connects into plug receiving member 183 (see FIG. 9) are indicated by like identifying letters to aid the discussion relative thereto. Thus, point A of circuit 100 connects with point A of circuit 200 so as to establish a ground line 184 at the same potential as the ground line 37. The establishment of electrical continuity between the J points of each circuit provides a potential on conductor 186 equal to the motor voltage supply 160. Conductor 186 leads to ground line 184 through the series connected switch 188 and light bulb 181. Thus, when switch 188 is closed light 181 will light by virtue of the voltage maintained on conductor 186.

Connection of the B points of each circuit results in the potential of supply 50 being maintained on conductor 189 which is tied to one of contacts 191. Contacts 191 are normally open and must therefore be closed before a voltage supply can be furnished to the circuit through point B.

Points C, D and H of circuit 200 are all tied to a common conductor 221 by conductors 221C, 221D and 221H, respectively. The C point of circuit 100 connects to the common line 121 so that the establishment of supply voltage at point C of circuit 200 will turn on timer 21. Point D of circuit 100 is electrically joined to a point between coils 124 and 126. When the two D points are joined, a short circuit is established across coil 126 so that contacts 142 cannot be moved to their off-normal position to remove the shunt line 144 from dialing contacts 13. This insures that the dialing contacts 13 are not effective in placing a signal on the telephone lines 101 when information is being recorded in the magnetic storage unit 11.

Point H of circuit 100 is connected to one end of a resistor 187 which has its other end connected between resistor 138 and resistor 134. Resistor 187 is connected in parallel with resistor 134 when circuit 100 is joined to circuit 200. Thus, the time constant which determines the length of time which the timer 21 will run once energized is altered. This change in the time constant enables the timer 21 to be employed in both the dialing and record cycles even though its on-time must be different for each cycle.

Figure 7:
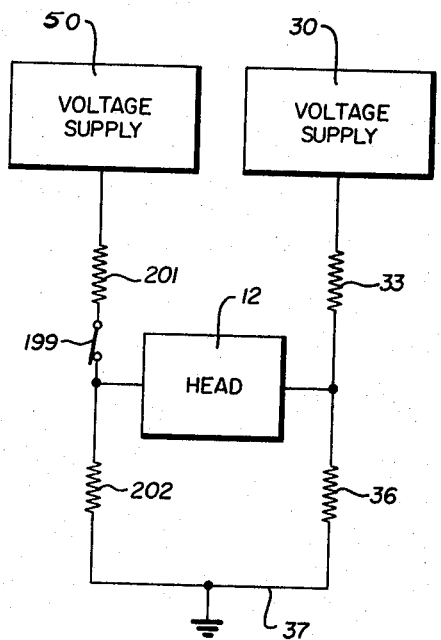
FIG. 7 is an electrical schematic diagram of the head circuit during a record cycle.

Connection point E of circuit 200 is in electrical continuity with a conductor 222 which is tied to one of normally open relay contacts 191b. The other one of relay contacts 191b is connected to the junction of dial contacts 199 and a resistor 202. The E point of circuit 100 connects through a shielded lead 223 to one side of head 12. The circuit formed (see FIG. 7) when the E connection points are joined directs current through the head 12 in one direction or the other depending upon the state of dial contacts 199. The F connection points join to provide a path for pulses to the inhibitor 17. The pulses to inhibitor 17 are generated in circuit 200 each time that contacts 199 open and close, and are employed to operate head drive 22.

If the tape is not in the location at which the new information is to be placed when the record unit is plugged in, movement after that time will result, if the head 12 is energized, in erasing portions of information which must be passed over to get to the desired location. To prevent this from occurring the normally open relay contacts 191b are disposed between the head 12 (connection point E) and the normally open relay contacts. Thus, in order to record or erase switch 191b must be closed. As previously indicated with reference to the dialing cycle, the head 12 comes to rest after the last digit of a code has been automatically dialed onto the telephone line 101. When another number is subsequently dialed through the automatic dialer, operation of the start switch 23 not only activates the timer 21, but also mechanically induces the head 12 to return to the starting edge of the tape. Thus, when the record unit is plugged into the main unit the head 12 will normally be at a position other than the starting edge of the tape. For this reason, normally open contacts 191 are provided between the B connection point and a supply line 226. Before relay contacts 191 will close and enable a supply voltage to be established on line 226, a current must flow through relay coil 191a which controls the condition of contacts 191. One manner of energizing coil 191a is to energize line 121 of circuit 100. This will place a voltage on connection point C which will induce a current which will flow through a diode 192, line 226, relay coil 191a, a resistor 193 and another relay coil 194 which is connected to ground line 184. Once coil 191a is energized and contacts 191 close, the loss of voltage at point C will not affect the voltage on line 226 since coil 191a will be energized directly through point B. The energization of coil 191a also causes switch 191b to close thus enabling recording current to be provided to the head 12.

In order to energize line 121, it is necessary to activate start switch 23. Thus, before circuit 200 can place information into the memory unit, start switch 23 must be activated which, as pointed out above, results in head 12 returning to the starting edge of the tape. (Start switch 23 is a double switch which can be operated to bring its electrical contacts together without inducing a return movement of the head—as when recording a dial tone pause—or it can be operated to bring its electrical contacts together and induce the head to return to its start position—as when starting to dial a number.) This insures that a voltage supply is not furnished to circuit 200 prior to the head 12 being returned to the starting edge of the tape, and prevents a code from being accidentally recorded on the tape from a position other than the starting edge, or the accidental erasure of a code it is desired to retain, if the tape is not moved to the new location before the dial unit is plugged in. Thus, after the record unit has been plugged into circuit 100, start switch 23 is activated after the desired tape location is obtained. The head drive 22 will simultaneously be energized for a single timer on-time period, so that the head 12 records an inter-digital time space at the starting edge of the tape.

Coil 194, coil 196 and contacts 188 form a relay which controls whether or not lamp 181 is lighted. Coils 194 and 196 are electrically disposed such that flux in one opposes flux in the other. Thus, when current flows through both coils contacts 188 will not be closed. Current will flow through coil 194 continuously, once a supply voltage is established on line 226. Current will only flow through coil 196 when timer 21 is on and line 121 energizes point C and line 221. A resistor 197 connects coil 196 to line 221. Thus, light 181 will only be on when timer 21 is off and the head 12 not moving. When these conditions exist the system is ready to have another digit recorded into the magnetic storage unit 11.

With the head 12 returned to the starting edge of the tape and voltage established on line 226, all that remains is to record the desired station designation code. The dial mechanism 178 is employed in its normal manner, and as is the case with the standard telephone, no signal is generated until the dial wheel has been rotated to its stop position and released. When the dial wheel is released, a drive means initiating switch 198, which is fully described in assignee's copending application for "Dial For Encoding in Magnetic Storage Type Telephone Dialers," Ser. No. 246,820, filed Dec. 24, 1962, is closed so as to form a connection between line 226 and line 221. When voltage is established on conductor 221 it is also established on common conductor 121 of circuit 100. This will turn timer 21 on and energize the head drive 22 so that the head 21 will begin to travel across the tape drive means initiating. Switch 198 is activated before the first pulse from the dial contacts 199 is generated so that the head 12 will be up to speed before the first information pulse is placed on the tape. A series circuit including a resistor 201, dial contacts 199 and resistor 202 forms a path between the supply line 226 and ground line 184. The manner in which the pulsing of dial contacts 199 induce a reversal of the current in head 12 is best seen with reference to FIG. 7 where the several components of circuit 100 and circuit 200 which are responsible for this operation are shown above.

As previously indicated, resistor 201, dialing contact 199 and resistor 202 form a path between voltage supply 60 and line 37. Resistors 33 and 36 of circuit 100 form a path between voltage supply 30 and line 37. Head 12 is connected at one side between dial contacts 199 and resistor 202 and at its other side between resistors 33 and 36. When the dial contacts 199 are closed (their normal non-activated state) voltages will be set up such that a current will flow through resistor 201, dial contacts 199, head 12 and resistor 36 to line 37, in that order. When the dial contacts 199 are open, however, the current which flows follows the path through resistor 33, head 12 and resistor 202. Thus, it is clearly seen how the current through the head 12 is reversed in direction with a change in condition of dial contacts 199. It is also seen that the potential sources need not be different in value as long as the bridge circuit is sufficiently unbalanced in the two states of dial contacts 199 to cause the appropriate head currents under the two conditions.

Connection point F of circuit 200 is connected through resistor 206 and capacitor 207 to dial contacts 199. A resistor 208 is connected between the B point and the F point and forms a voltage divider network with a resistor 209 connected between the F point and line 84. Each time that the dial contacts 199 open and close the voltage level on the dial contacts 199 will change causing a signal to pass through capacitor 207 onto point F. Point F of circuit 100 is electrically tied to inhibitor 17 so that the voltage changes of point F of circuit 200 will provide the same information as signals received from the amplifier 114, and slicer 16 during the dialing cycle. Those signals which are generated in the head 12 by the change in current direction do pass through the amplifier 14 and slicer 16, and would except for the F point connection pass through the timer 21. The combination of resistors 156, 208 and 209 are effective in attenuating the signals transmitted through the amplifier 14 sufficiently to prevent them from triggering the multivibrator 19.

When the dial contacts 199 generate the last pulse of a digit train the timer 21 will run for the length of time determined by the time constant of the parallel resistors 187 and 134, and capacitor 133. After this period has run out the timer 21 will be turned off by virtue of four-layer diode 113 being triggered into its conducting state causing transistor 122 to become non-conducting. The length of time which the timer 21 runs, and thus the head 21 moves, after the last pulse determines the major portion of the inter-digital time (the other portion is formed by the travel of the head 12 after the drive means initiating switch 198 pulse and before the first dialing contacts 199 pulse) which will be subsequently read when the code is recalled at a later time.

In all dial wheel mechanism such as that shown at 178 in FIG. 8 it is necessary that the return speed of the dial wheel be precisely controlled. One means of so controlling the dial wheel is to furnish it with a brake in the form of a synchronous motor. A synchronous motor 212 is employed for this purpose and has one side connected to line 184 and the other to a conductor 228 leading to point K of circuit 200. Point K of circuit 100 connects to the motor voltage supply 160 through contact 124b the same as does head drive 22. Thus, each time that the head 12 is energized, which is after the dialing wheel is released, a synchronous motor provided for the purpose of maintaining constant return speed of the dial wheel will also be energized.

A diode 230 is connected between coil 191a and line 184, and a diode 232 is connected between coil 196 and line 184 to prevent inductively produced voltages from generating false signals or damaging components.

The above description illustrates how the several components of the detachable dial mechanism combine with the main circuit of the automatic dialer to provide means for recording information onto the tape in a precise and dependable manner. The operation of the record unit to enter a new code into the memory is exceptionally simple, thus enabling it to be employed by telephone subscribers without complicated instructions. It should be mentioned that while the record mechanism has made reference to a dial mechanism including a dial wheel, it is to be understood that the invention is in no way limited thereto. A number of dialing mechanisms employing pushbuttons have been developed in the art over the past few years and are suitable for operation with the present invention, as is apparent from an inspection of the manner in which they operate.

The foregoing detailed description of the present invention teaches an electronic logic circuit for automatically transferring information magnetically stored in a memory unit to a set of dialing contacts in a manner which meets the most rigid standards of telephony. The present invention provides a low cost, simple to operate, compact unit which is suitable for use by the vast majority of subscribers presently using telephone equipment.

The ability to produce a low cost automatic dialer depends on the ability to furnish dependable electronic systems. The present invention provides the first electronic systems for an automatic dialer which are sufficiently dependable and low in cost to be suitable for general use. This distinction is due to the unique and novel methods and apparatus which the foregoing description has set forth in detail.

While the various novel methods and circuits taught by the present invention have been applied to transferring analog information from a memory unit to a set of contacts for telephone purposes, there are numerous other applications not involving telephones to which the teachings herein are applicable. Such applications include computer information transfer, teletype message transmission, etc., and the invention is thus not limited to use with the telephone exclusively.

We claim:
1. In a telephone repertory dialer of the type having
   (1) information storage apparatus employing a magnetizable medium,
   (2) transducer means for recording magnetic signals on the magnetizable medium and for reading the magnetic signals stored on the magnetizable medium,
   (3) a motor for causing relative motion between the transducer means and the magnetizable medium,
the improvement of motor control apparatus comprising:
   (a) a first switch means for energizing the motor for a first time period equal to the interval between digits of a telephone number to be recorded;
   (b) a manually actuable second switch means for energizing the motor for a second time period that is longer than the first time period;
   (c) a first and a second electronic switch, each having a conductive and a non-conductive state and each being normally in its non-conductive state;
   (d) means, in circuit between the first and the second electronic switch, to inhibit the latter from its conductive state except when the former is in its conductive state;
   (e) a relay coil in circuit with the second electronic switch, the relay coil having a set of normally open contactors associated therewith to complete, when closed, a circuit to energize the motor;
   (f) means, responsive to actuation of either the first or the second switch means, to cause both the first and the second electronic switches to change to their conductive states whereby to energize the relay coil, close the normally open contactors and energize the motor; and
   (g) means operative at the end of the first period after actuation of the first switch means and at the end of the second period of time after actuation of the second switch means to return the first electronic switch to its non-conductive state, thereby causing the second electronic switch to return to its non-conductive state and de-energize the relay coil, whereupon the contactors open and de-energize the motor.

2. The improvement according to claim 1, further including:
   (a) means, responsive to the signals representative of the successive digits of a telephone number to be recorded, for switching the first and the second electronic switches to their conductive states and for switching the first electronic switch back to its non-conductive state at the end of the first period after each one of such digits has been recorded, thereby to energize and deenergize the motor as the signals representative of the successive digits of a telephone number are recorded; and,
   (b) means, responsive to the recorded signals representative of the successive digits of a telephone number, for switching the first and the second electronic switches to their conductive states and for switching the first electronic switch back to its non-conductive state only at the end of the second period after all the digits in the recorded telephone number have been reproduced, thereby to energize the motor as long as signals representative of the successive digits in a recorded telephone number are being reproduced and to deenergize the electric motor after all such signals have been reproduced.

References Cited by the Examiner

UNITED STATES PATENTS

| | | | |
|---|---|---|---|
| 2,929,968 | 3/1960 | Henisch | 317—41 |
| 2,941,043 | 6/1960 | Ham | 179—90.2 |
| 3,032,690 | 5/1962 | Elliot | 317—41 |
| 3,104,285 | 9/1963 | Kobler | 179—90.2 |
| 3,104,288 | 9/1963 | Kobler | 179—90.2 |
| 3,105,121 | 9/1963 | Field | 179—90.2 |
| 3,188,498 | 6/1965 | Gabor | 307—88.5 |
| 3,194,977 | 7/1965 | Anazalone | 307—88.5 |

KATHLEEN H. CLAFFY, *Primary Examiner.*

ROBERT H. ROSE, *Examiner.*

J. W. JOHNSON, H. ZELLER, *Assistant Examiners.*